(No Model.)
C. W. RICHARDSON.
WAGON TIRE.
No. 364,545. Patented June 7, 1887.
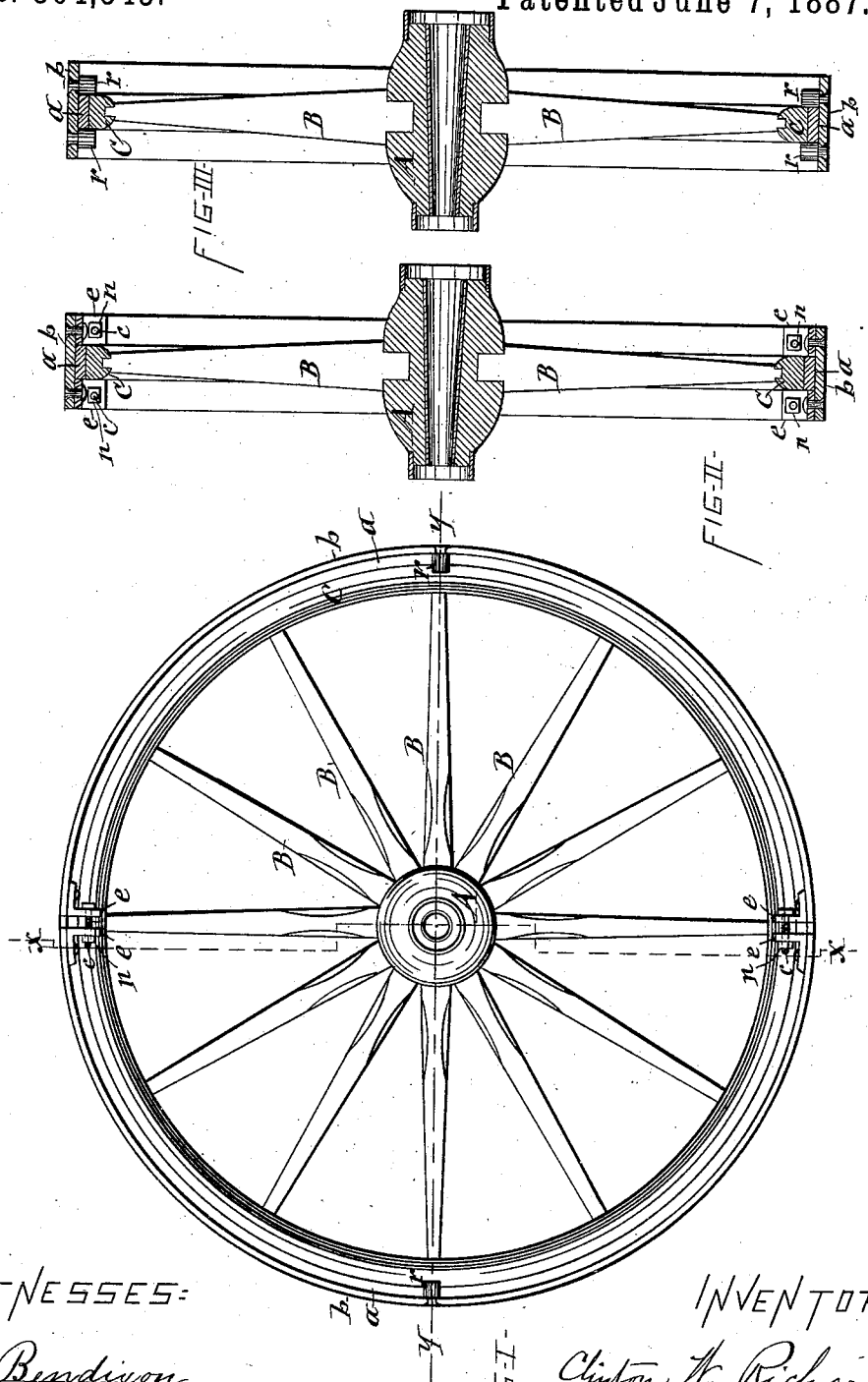
WITNESSES:
C. Bendixon
J. H. Gibbs
INVENTOR:
Clinton W. Richardson
per Duell, Laass & Hay
his Attys.
N. PETERS, Photo-Lithographer, Washington, D. C.

UNITED STATES PATENT OFFICE.

CLINTON W. RICHARDSON, OF BATH, NEW YORK.

WAGON-TIRE.

SPECIFICATION forming part of Letters Patent No. 364,545, dated June 7, 1887.

Application filed November 19, 1885. Serial No. 183,297. (No model.)

*To all whom it may concern:*

Be it known that I, CLINTON W. RICHARDSON, of Bath, in the county of Steuben, in the State of New York, have invented new and useful Improvements in Wagon-Tires, of which the following, taken in connection with the accompanying drawings, is a full, clear, and exact description.

This invention relates to supplementary tires applied to the fixed tires of wagon-wheels for the purpose of widening the tread, and thus better adapt said wheels for traveling over soft ground; and the invention consists in improved means for detachably connecting to the fixed tire a supplementary tire composed of flat bands bent into segments and encompassing the fixed tire, and projecting over the edges thereof, as hereinafter more fully described, and specifically set forth in the claim.

In the accompanying drawings, Figure I is a side elevation of a vehicle-wheel provided with my improvement; and Figs. II and III are diametrical sections taken, respectively, on lines $x\ x$ and $y\ y$, Fig. I.

Similar letters of reference indicate corresponding parts.

A represents the hub, B B the spokes, C the felly, and $a$ the tire, of an ordinary wagon-wheel. $b$ designates the supplemental tread or tire, which I detachably apply to the fixed tread or tire $a$ in the following manner. This supplemental tire may be of any desired width in excess of that of the fixed tire, one of its purposes being to increase the width of the tread, when necessary, for traveling over soft ground. Said tire $b$, I form of plain flat bands bent into segments, which, when applied to the fixed tire $a$, project over the edges thereof, and the ends of each segment are provided with inwardly-projecting ears $e\ e$, which embrace between them the fixed tire and the felly, and thus serve to sustain the supplemental tire $b$ laterally on the fixed tire. Said ears are perforated for the reception of the coupling-bolts $c$, which pass through the said ears, and are provided with nuts $n$, by which to draw the supplemental tire-sections together and firmly clamp the same on the fixed tire. The central portions of the aforesaid segments are sustained laterally in their position on the fixed tire by means of lugs or projections $r$ on the inner side of the segment, which projections bear against opposite edges of the fixed tire.

It will be observed that the described supplemental tire forms a broad uniform tread, which can be readily applied to the fixed tire or tread of the wheel and as readily removed therefrom when desired, thus enabling a farmer to equip his ordinary road-wagon with a tread of increased breadth whenever he desires to use said wagon in a field or meadow.

Having described my invention, what I claim is—

The combination, with a vehicle-wheel, of a supplemental tire composed of plain flat bands bent into segments, embracing the periphery of the fixed tire and projecting over the edges thereof, and provided at their ends with inwardly-projecting ears abutting against opposite edges of the fixed tire, coupling-bolts passing through the ears of the adjacent ends of the segments, and tightening-nuts on said bolts, substantially as described and shown.

In testimony whereof I have hereunto signed my name and affixed my seal, in the presence of two attesting witnesses, at Bath, in the county of Steuben, in the State of New York, this 4th day of November, 1885.

CLINTON W. RICHARDSON. [L. S.]

Witnesses:
PHILANDER P. THARP,
W. W. LINDSAY.